United States Patent
Johnson et al.

(10) Patent No.: US 11,165,266 B2
(45) Date of Patent: Nov. 2, 2021

(54) METHOD OF PROVIDING CHARGE FOR A MECHANICAL OBJECT

(71) Applicant: Systematic Power Solutions, LLC, Knoxville, TN (US)

(72) Inventors: Scottie Johnson, Knoxville, TN (US); Eric C. Ricker, Knoxville, TN (US)

(73) Assignee: Systematic Power Solutions, LLC, Knoxville, TN (US)

( * ) Notice: Subject to any disclaimer, the term of this patent is extended or adjusted under 35 U.S.C. 154(b) by 115 days.

(21) Appl. No.: 16/437,517

(22) Filed: Jun. 11, 2019

(65) Prior Publication Data

US 2020/0127479 A1    Apr. 23, 2020

Related U.S. Application Data

(63) Continuation-in-part of application No. 16/352,555, filed on Mar. 13, 2019, now Pat. No. 11,069,488.

(60) Provisional application No. 62/747,902, filed on Oct. 19, 2018, provisional application No. 62/753,241, filed on Oct. 31, 2018, provisional application No. 62/769,411, filed on Nov. 19, 2018.

(51) Int. Cl.
| | |
|---|---|
| *H02J 7/00* | (2006.01) |
| *H02J 7/14* | (2006.01) |
| *H01M 10/44* | (2006.01) |
| *H01M 10/0525* | (2010.01) |
| *H02J 7/34* | (2006.01) |

(52) U.S. Cl.
CPC ....... *H02J 7/0045* (2013.01); *H01M 10/0525* (2013.01); *H01M 10/44* (2013.01); *H02J 7/00* (2013.01); *H02J 7/14* (2013.01); *H01M 2220/20* (2013.01); *H02J 7/345* (2013.01)

(58) Field of Classification Search
CPC .... H02J 7/0045; H02J 7/00; H02J 7/14; H02J 7/345; H02J 7/0042; H01M 10/44; H01M 10/0525; H01M 2220/20; H01M 10/052; H01M 10/4264; H01M 10/00; H01M 2220/00
See application file for complete search history.

(56) References Cited

U.S. PATENT DOCUMENTS

| | | |
|---|---|---|
| 6,765,312 B1 | 7/2004 | Urlass et al. |
| 7,119,518 B1 | 10/2006 | Dougherty et al. |
| 7,193,390 B2 | 3/2007 | Nagai et al. |
| 7,362,005 B2 | 4/2008 | Leblanc |

(Continued)

*Primary Examiner* — Hal Kaplan
*Assistant Examiner* — Joseph N Inge
(74) *Attorney, Agent, or Firm* — Peter L. Brewer; Thrive IP

(57) ABSTRACT

A method of charging a mechanical object using a charge storage device. The method includes determining that an initial battery has lost voltage, removing the initial battery, and installing a replacement battery. Installing the replacement battery places the replacement battery in electrical communication with an adjacent capacitor. In another embodiment, the method includes providing a capacitor in a locomotion machine, and energizing a starter in electrical communication using the capacitor. The method also includes starting an engine of the locomotion machine using a charge from the starter, and then re-charging the capacitor as the locomotion machine moves. The method further comprises determining that the capacitor has lost voltage due to insufficient recharge activity, and re-charging the capacitor with a portable power pack.

27 Claims, 10 Drawing Sheets

(56) References Cited

U.S. PATENT DOCUMENTS

| | | | |
|---|---|---|---|
| 7,548,409 B2 | 6/2009 | Kojima et al. | |
| 7,667,432 B2 | 2/2010 | West et al. | |
| 7,887,943 B2 | 2/2011 | Yoshikane et al. | |
| 8,264,333 B2 | 9/2012 | Blaker et al. | |
| 8,305,733 B2 | 11/2012 | Chan et al. | |
| 8,379,367 B2 | 2/2013 | Oh et al. | |
| 8,792,224 B2 | 7/2014 | Kim et al. | |
| 9,272,627 B2 | 3/2016 | Miller | |
| 9,300,018 B2 | 3/2016 | Watson et al. | |
| 9,627,908 B2* | 4/2017 | Kaminsky | H01G 9/28 |
| D792,847 S | 7/2017 | Stone et al. | |
| 9,803,609 B2 | 10/2017 | Setterberg et al. | |
| 9,911,541 B2 | 3/2018 | Wang et al. | |
| 9,991,060 B2 | 6/2018 | Bouchard et al. | |
| 10,103,374 B2* | 10/2018 | Balk | H01M 50/529 |
| 10,153,096 B2 | 12/2018 | Xi et al. | |
| D840,340 S | 2/2019 | Suszko et al. | |
| 2002/0041174 A1* | 4/2002 | Purkey | H02J 7/345 |
| | | | 320/103 |
| 2006/0005739 A1* | 1/2006 | Kumar | B60L 50/15 |
| | | | 105/35 |
| 2009/0274956 A1* | 11/2009 | Kosugi | H01M 50/502 |
| | | | 429/158 |
| 2009/0325042 A1* | 12/2009 | Koetting | H01M 10/0413 |
| | | | 429/90 |
| 2010/0079109 A1* | 4/2010 | Eilertsen | H02J 3/32 |
| | | | 320/127 |
| 2011/0288738 A1* | 11/2011 | Donnelly | F02D 19/0665 |
| | | | 701/99 |
| 2012/0301750 A1* | 11/2012 | Reis | H01M 16/00 |
| | | | 429/7 |
| 2013/0260611 A1* | 10/2013 | Ahn | H01M 50/20 |
| | | | 439/627 |
| 2013/0264875 A1* | 10/2013 | Kaminsky | H01M 50/10 |
| | | | 307/52 |
| 2014/0136055 A1 | 5/2014 | Sugiyama et al. | |
| 2016/0176298 A1 | 6/2016 | Watson et al. | |
| 2016/0297317 A1* | 10/2016 | Huang | H02J 7/0047 |
| 2016/0327007 A1* | 11/2016 | Averbukh | F02N 11/10 |
| 2017/0129514 A1* | 5/2017 | Shubs, Jr. | B61L 27/04 |
| 2017/0194903 A1* | 7/2017 | Herbert | H01M 16/00 |
| 2018/0013112 A1* | 1/2018 | Cameron | H01M 10/30 |

* cited by examiner

METHOD OF PROVIDING CHARGE FOR A MECHANICAL OBJECT

STATEMENT OF RELATED APPLICATIONS

This application claims the benefit of U.S. Ser. No. 62/747,902 filed Oct. 19, 2018. That application is entitled "Hybrid Energy Storage Device" and is incorporated herein in its entirety by reference.

This application also claims the benefit of U.S. Ser. No. 62/753,241 filed Oct. 31, 2018. That application is also entitled "Hybrid Energy Storage Device" and is incorporated herein in its entirety by reference.

This application further claims the benefit of U.S. Ser. No. 62/769,411 filed Nov. 19, 2018. That application is entitled "Method of Charging a Mechanical Object" and is also incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE DISCLOSURE

This section is intended to introduce selected aspects of the art, which may be associated with various embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present disclosure relates to the field of power generation for mobile units. More specifically, the present invention relates to methods of charging a mobile object using a combination of a capacitor and battery.

DISCUSSION OF TECHNOLOGY

Batteries and capacitors are both used for storing electrical charge. However, they operate in very different ways.

Batteries utilize two electrical terminals, referred to as "electrodes." The electrodes are separated by a chemical substance called an electrolyte. Electrical energy is released in response to a chemical reaction involving the electrodes and the electrolyte. Once the chemicals have been depleted, the reactions stop and the battery is no longer able to provide a charge.

Some batteries are rechargeable. A well-known example is the lithium-ion power pack used for laptop computers and small, portable electronic devices. In these batteries, the electricity-inducing reactions run between the terminals in either direction. The result is that the battery can be charged and discharged and re-charged hundreds of times before replacing.

Batteries are frequently used in cars, trucks, boats, jet skis and other mobile units as a way of providing the initial starting charge for an internal combustion engine. For electrical cars and motorcycles, batteries provide ongoing power to turn a shaft and to power electrical devices (such as a radio and sensors). Beneficially, electric motors have a much broader torque curve than internal combustion engines, and produce 100% of their torque at 0 RPM's. Electric motorcycles can operate without a transmission and electric automobiles can operate with only a single speed gear box.

Batteries can also be used to provide power for portable refrigeration units such as those found in rail cars and over-the-road trailers.

Currently, most mechanical objects are powered by a lead-acid battery. Such batteries are reliable when used in the right conditions. A good lead-acid battery will offer around 2,000 crank cycles which means it should last 3 to 5 years.

As noted, some batteries are re-chargeable. The larger the charge that is needed, the larger the battery (measured in kilo-watts). Depending on size, batteries can hold large amounts of power. At the same time, they can take many hours to re-charge. For example, batteries used for electric motorcycles typically take 4 to 7 hours to re-charge.

Capacitors, on the other hand, can be charged almost instantly. Capacitors weigh less than batteries and typically do not contain chemicals or toxic metals. The downside though is that capacitors can store only small amounts of power.

Capacitors use static electricity (or electrostatics) rather than chemistry to store energy. A capacitor utilizes two opposing conducting metal plates with an insulating material there between. The insulating material is referred to as a dielectric. Positive and negative electrical charges build up on the plates, preventing them from coming into contact. The dielectric allows a capacitor of a certain size to store more charge at the same voltage.

Some capacitors are referred to as super-capacitors. A super-capacitor (or ultra-capacitor) differs from an ordinary capacitor in that its plates effectively have a much bigger surface area and the distance between them is much smaller. In the case of a super-capacitor, the plates are made from a metal coated with a porous substance such as powdery, activated charcoal. The porosity provides the greater surface area for storing more charge, providing more Farads. Also of interest, in a super-capacitor there is no dielectric material per se; instead, both plates are soaked in an electrolyte and separated by a very thin insulator.

When the plates are charged, an opposite charge forms on either side of the separator, creating what is called an electric double-layer. The double-layer is extremely thin, perhaps only one molecule thick (compared to a dielectric that might range in thickness from a few microns to a millimeter or more in a conventional capacitor). For this reason, super-capacitors are sometimes referred to as double-layer capacitors, or electric double-layer capacitors ("EDLC's").

The capacitance of a capacitor increases as the area of the opposing plates increases and also as the distance between the plates decreases. Capacitors have many advantages over batteries. As noted above, they generally weigh less. They can also be charged and discharged hundreds of thousands of times without wearing out. However, by design they are unable to store a charge as do batteries.

Super-capacitors are ideal for providing an initial charge for an internal combustion engine. For example, a super-capacitor may be used to provide a charge for the starter on an ICE motorcycle. A small battery is permanently fixed in a housing with the capacitor to power up the capacitor for its one-time charge.

The expanding market of portable electronic devices and, especially, the emergence of electric vehicles and hybrid electric vehicles, has created increasing demand for energy devices. In some cases, a battery will be used with a capacitor. Different applications will require different combinations of capacitor and battery. Currently, companies offer numerous combined capacitor and battery units to meet these different applications. However, the battery and the capacitor are sold to the customer and installed as singular units, requiring the supplier or distributor to carry numerous units meeting different energy requirements.

Therefore, a need exists for a modular system wherein different sizes of capacitors (including super-capacitors) may be mechanically and electrically connected to different sizes of batteries, depending on the application. Further, a need exists for new methods of charging a mobile device (such as a motorcycle or a jet ski) using a combined capacitor and battery.

BRIEF SUMMARY OF THE DISCLOSURE

A method of using a charge storage device is first provided herein. The charge storage device is intended to be used for a mobile object. Specifically, the charge storage device is intended to be used for a mechanical object that has an internal combustion engine such as an automobile, a truck, a boat, a motorcycle, a jet ski, a four-wheeler or an off-road (not "street legal") vehicle.

The method first includes providing a charge storage device. The charge storage device comprises a capacitor and an initial battery. The capacitor and the initial battery each reside within a housing, meaning they reside within the same housing. The housing, in turn, is carried on the mobile object.

The method also includes determining that the initial battery has lost voltage. In one aspect, this takes place when the user attempts to turn over the engine but finds that the battery has gone cold, or is "dead."

The method additionally includes removing the initial battery from the housing. This will require some disassembly of the housing, such as the removal of a top.

The method then comprises installing a replacement battery to replace the initial battery. Installing the replacement battery places the replacement battery in electrical communication with the capacitor within the housing.

In one embodiment, the method also includes recharging the initial battery for future use. This is done after the initial battery has been removed.

A separate method of charging a mechanical object using a charge storage device is provided herein. In this method, the mechanical object resides on a locomotion machine. The locomotion machine has an internal combustion engine and may be selected from one of an automobile, a truck, a boat, a motorcycle, a jet ski, and an off-road vehicle.

In one embodiment, the method first comprises providing a capacitor in the locomotion machine. Preferably, the capacitor resides within a housing that is placed on the locomotion machine. The capacitor is sized to provide an electric charge for a starter on the locomotion machine. In this instance, "size" refers to capacitance, or storage potential. This is typically measured in Farads.

The method also includes energizing a starter in electrical communication with the capacitor.

The method then includes starting an engine of the locomotion machine using a charge initiated by the capacitor.

The method further comprises recharging the capacitor as the locomotion machine moves. Preferably, the capacitor is recharged using a flywheel generator or an alternator on the locomotion machine. Preferably, no battery resides on the locomotion machine for energizing the starter.

Additionally, the method includes connecting a power pack to the capacitor after a period of inactivity. Preferably, this includes a step of determining that the capacitor has lost voltage due to insufficient recharge activity. Connecting the power pack to the capacitor includes using a power cable to provide an electrical connection. The power cable may be, for example, a standard or a micro-USB cable that plugs into a USB port on a capacitor housing.

It is noted that the power pack will preferably represent a portable or hand-held battery. The battery will need to have an appropriate size to re-charge the capacitor. In this instance, "size" refers to electrical energy. Size may be measured in voltage and/or amps. More preferably, size refers to kilo-watt hours for a battery. The manufacturer of the locomotion machine or of the capacitor will recommend an appropriate size for the battery.

The method then includes recharging the capacitor with the hand-held power pack.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 8 also shows, in inset, a capacitor rechargeable with a portable or hand-held power supply.

DETAILED DESCRIPTION OF VARIOUS EMBODIMENTS

Figure 1:
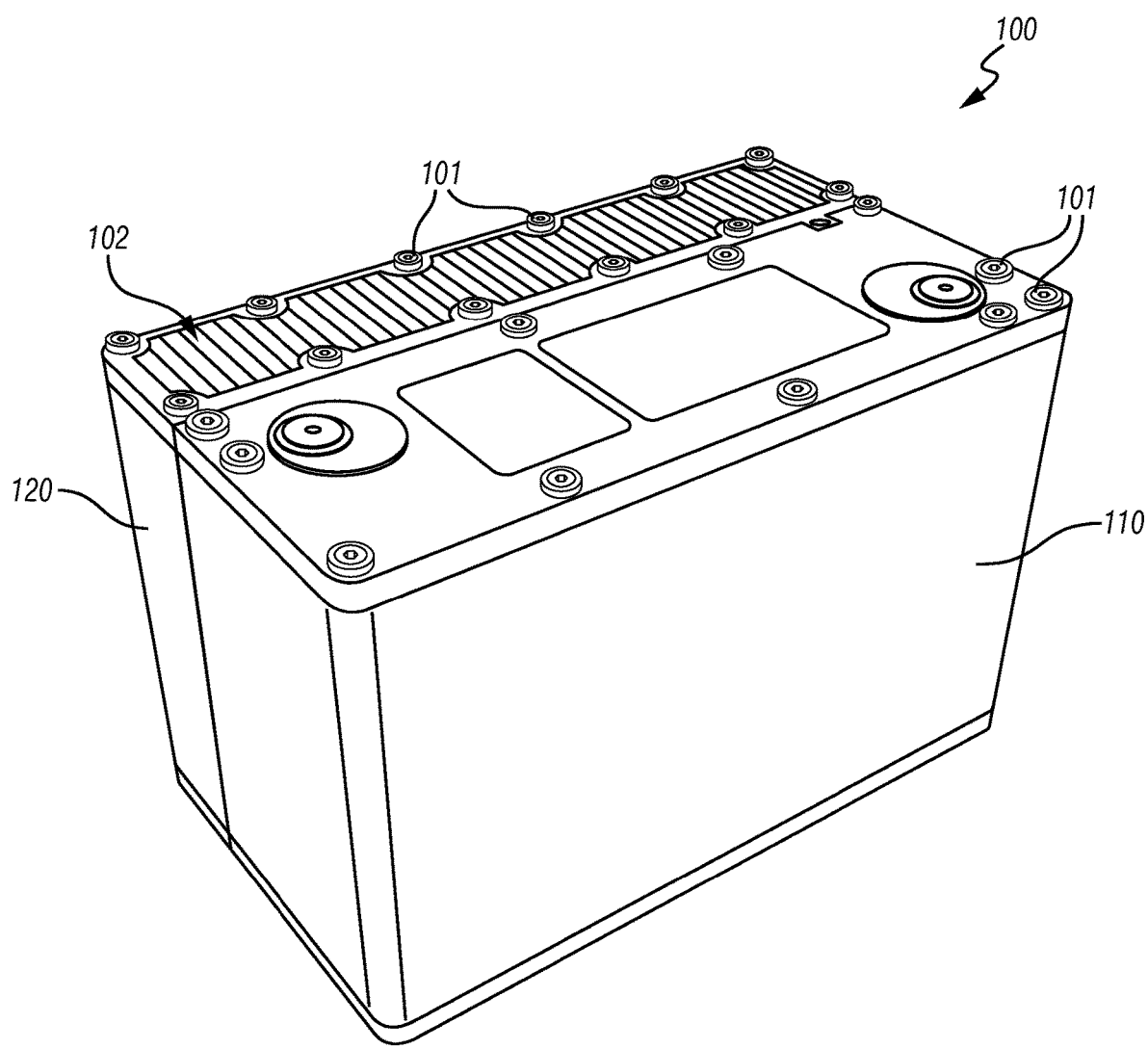
FIG. 1 is a perspective view of a hybrid energy storage device of the present invention, in one embodiment. The energy storage device represents a combined capacitor and battery, wherein each of the capacitor and battery reside in their own separate module.

FIG. 1 is a perspective view of a hybrid energy storage device 100 of the present invention, in one embodiment. The energy storage device 100 represents a combined battery 110 and capacitor 120, wherein each of the battery 110 and the capacitor 120 resides in its own separate module.

In the view of FIG. 1, the battery 110 and the capacitor 120 have been connected, forming a single energy storage device 100. A plurality of bolts 101 are shown securing a cover 102 to the device 100. In actuality, the cover 102 is a pair of separate covers (presented as 112 and 122 in FIGS. 2 and 3) residing together over the respective modules 110, 120.

Figure 2:
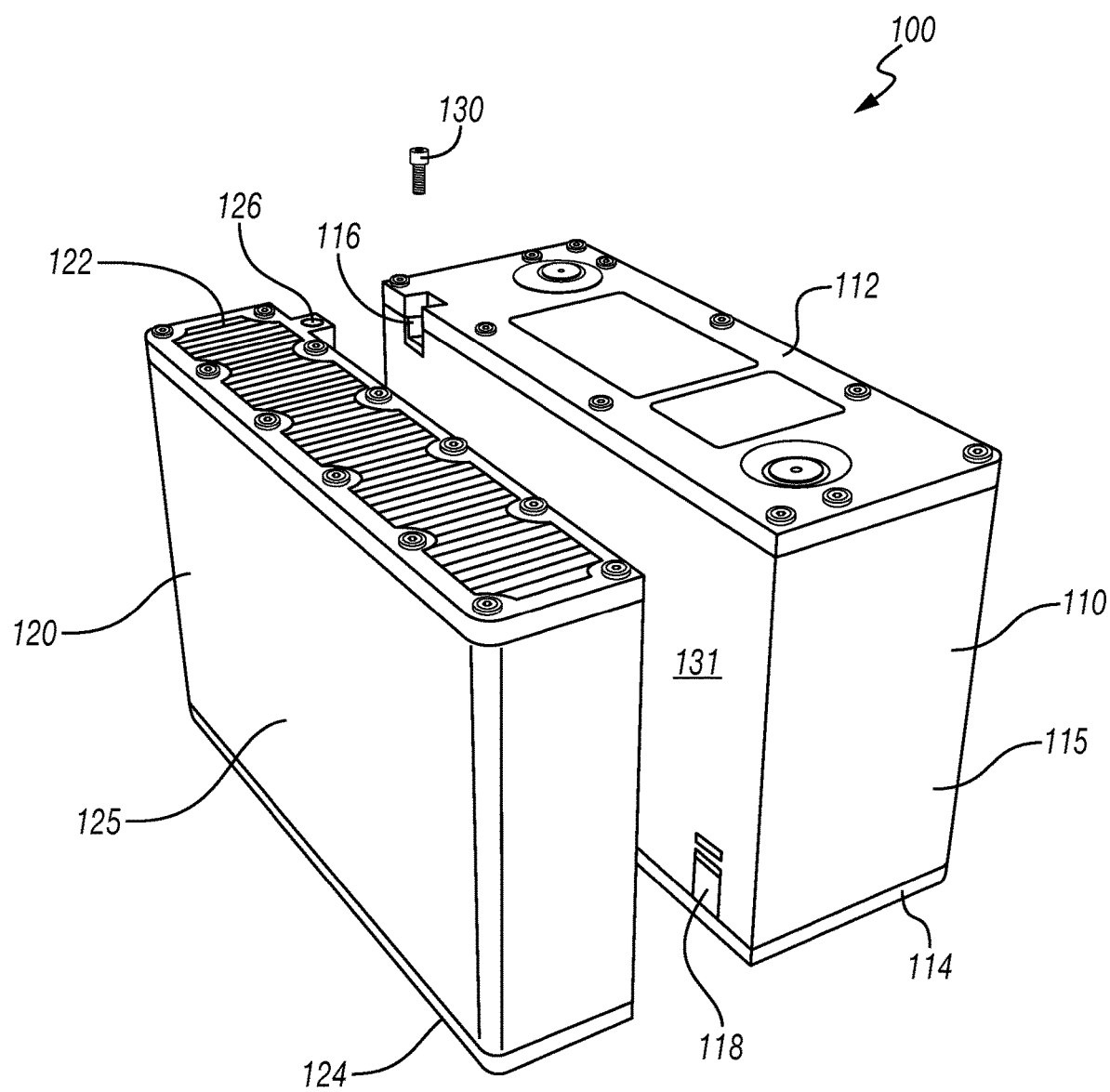
FIG. 2 is an exploded perspective view of the hybrid energy storage device of FIG. 1. Here, the capacitor is separated from the battery. Similarly, a threaded connector is exploded away from male and female mating portions.
Figure 3:
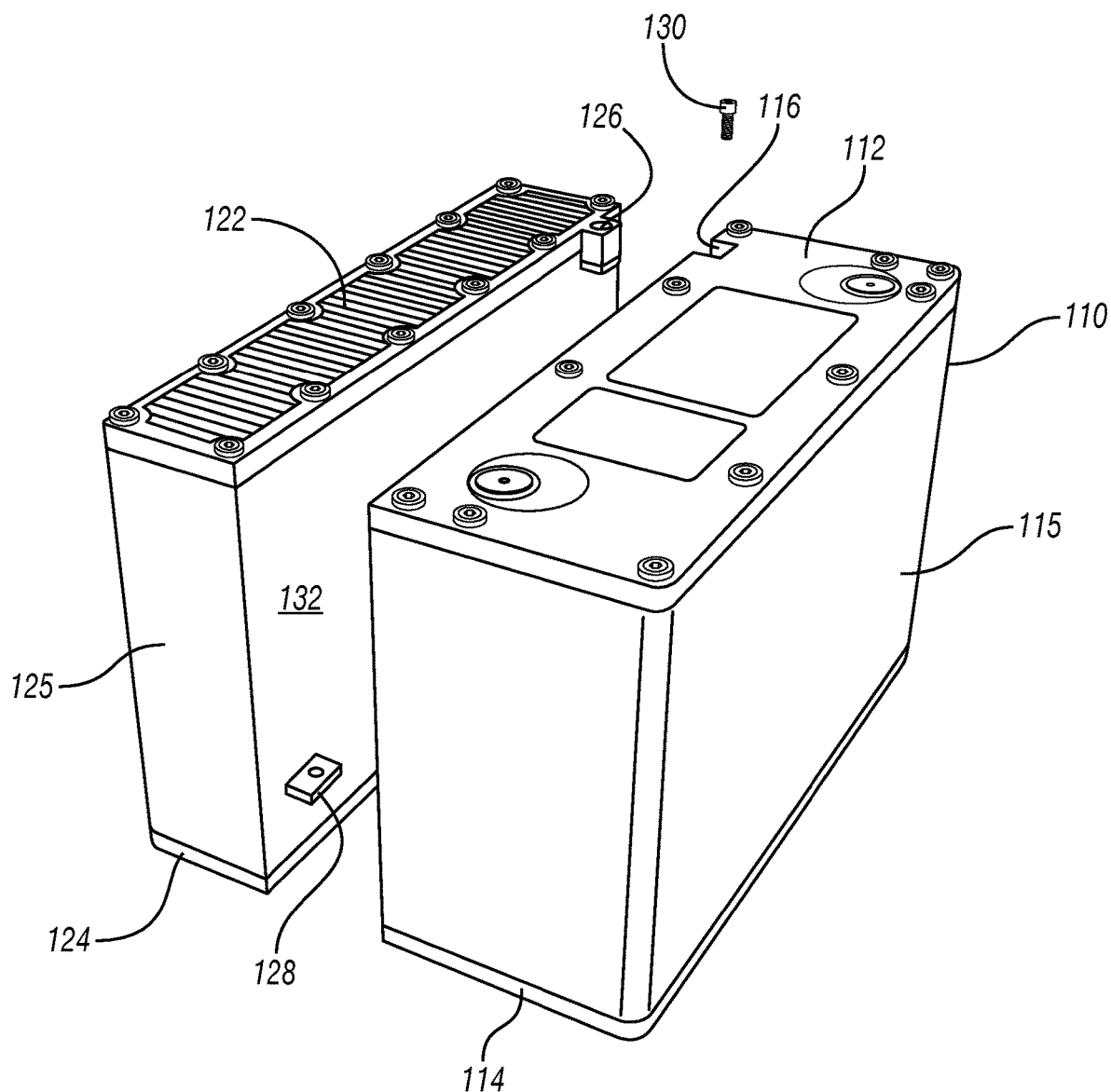
FIG. 3 is another exploded perspective view of the hybrid energy storage device of FIG. 1, shown from a different angle.

FIG. 2 is an exploded perspective view of the hybrid energy storage device 100 of FIG. 1. Here, the capacitor 120 is separated from the battery 110. FIG. 3 is another exploded perspective view of the hybrid energy storage device 100 of FIG. 1. In this figure the separated capacitor 120 and battery 110 are shown from a different angle.

As can be seen from FIGS. 1-3, the battery 110 comprises a body 115 having a polygonal profile. The body 115 has a top cover 112 and a base 114. The body 115 comprises a female connector portion 116 on one side 131. In this arrangement, the connector portion 116 defines a recessed portion of the body 115. The body 115 further includes a female electrical connector 118 on the same side 131.

The capacitor 120 also comprises a body 125 having a polygonal profile. The body 125 too has a top cover 122 and a base 124. The body 125 comprises a male connector portion 126 on one side 132. The body 125 further includes a male electrical connector 128 on the same side 132.

As demonstrated in FIG. 1, the battery 110 and the capacitor 120 are configured to be joined together to form a single energy storage device 100. Joining the modules 110, 120 involves placing the side 131 of the battery 110 adjacent the side 132 of the capacitor 120. The two bodies 115, 125 are pushed together so that the male connector portion 126 of the capacitor 120 is received by the female connector portion 116 of the battery 110. At the same time, the male electrical connector 128 of the capacitor 120 is received by the female electrical connector 118 of the battery 110.

To maintain the two bodies 115, 125 as a singular device 100, one or more threaded connectors may be used. In the arrangement of FIGS. 2 and 3, a threaded connector 130 is exploded away from male 126 and female 116 mating portions for illustrative purposes. The male 126 and female 116 mating portions are configured to receive the threaded connector 130 together.

Figure 4A:
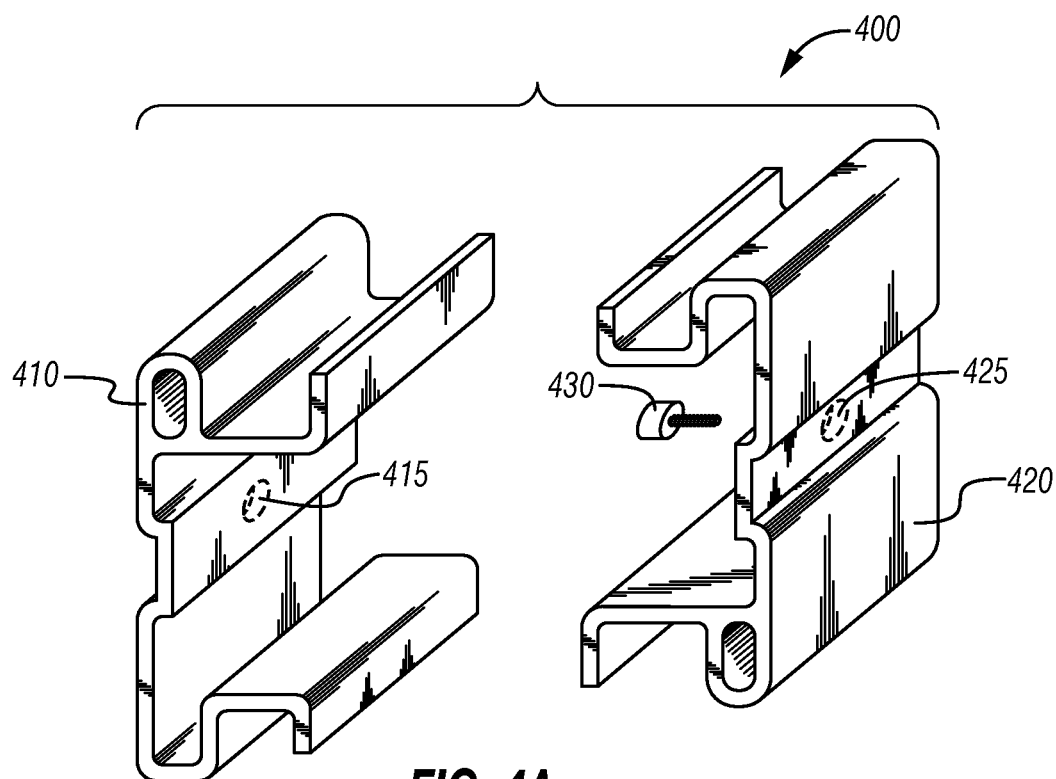
FIG. 4A is a perspective view of an optional connector system for connecting the capacitor and the battery of FIGS. 2 and 3. Here, clips of the connector system are exploded apart for illustrative purposes.

In an alternate, optional arrangement, the battery 110 and the capacitor 120 may be mechanically connected using mating clips. FIG. 4A is a perspective view of an optional connector system 400 for connecting the battery 110 and the capacitor 120 of FIGS. 2 and 3. The connector system 400 employs a first clip 410 and a second clip 420. In this illustrative arrangement, each clip 410, 420 is a mirror image of the other.

The clip 410 is designed to be connected to a side (such as side 131) of the battery 110. This connection may be made through an integral plastic injection molding of the body 115, or it may be secured using a threaded connector 430.

Similarly, the clip 420 is designed to be connected to a side (such as side 132) of the capacitor 120. This connection too may be made through an integral plastic injection molding of the body 125, or it may be secured using a threaded connector such as connector 430.

Figure 4B:
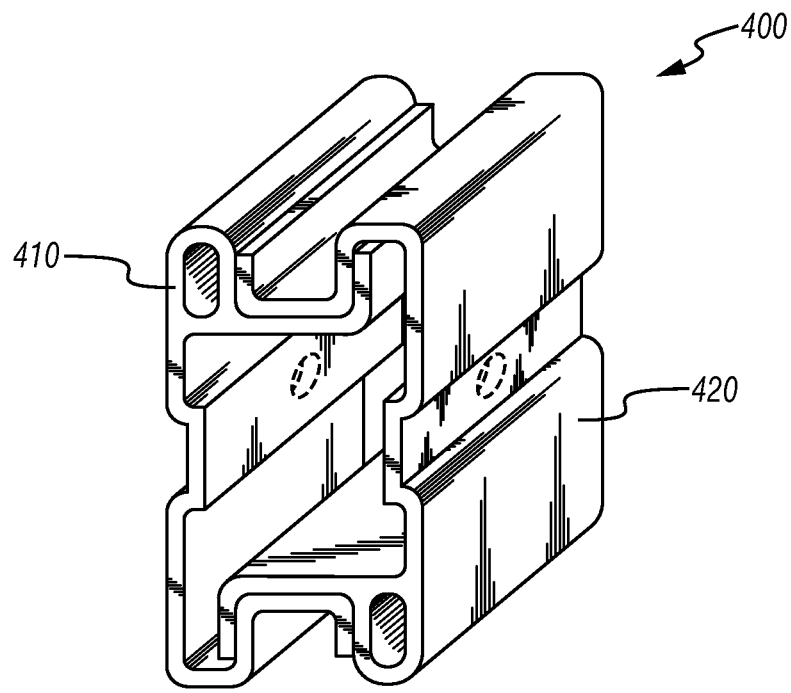
FIG. 4B is another perspective view of the connector system of FIG. 4A. Here, the clips have been mechanically connected.

In the view of FIG. 4A, the clips 410, 420 are in exploded apart relation for illustrative purposes. FIG. 4B is another perspective view of the connector system 400 of FIG. 4A. Here, the clips 410, 420 have been mechanically connected. This has been done by interlocking the clips 410, 420 together. Of interest, the clips 410, 420 are self-interlocking through the use of gravity and the mirrored configuration.

It is observed that the connector system 400 is merely illustrative. Other clip or other connector arrangements may be used. If clips are used, then the electrical connectors 118, 128 may need to be reconfigured such as by extending their lengths. A non-conductive coating may also need to be provided for the clips.

For purposes of the energy storage device 100, it is preferred that the device 100 offer high energy, high power densities and long cycling life. The battery 110 is preferably a lithium-ion battery (or "LIB") while the capacitor 120 is preferably a supercapacitor (or "SC").

It is understood that LIB's can deliver high energy densities (150-250 Watt-hours/kg) by utilizing Faradaic reactions throughout the active materials comprising the batteries. However, this mechanism may lead to low power densities (<1,000 Watts/kg) since solid-state ion diffusion in bulk electrodes is generally slow. LIB's may also suffer from short cycling lives (<1,000 cycles) due to degradation of material structures.

On the opposite extreme, SC's typically offer high power densities (about 1,000 to 10,000 Watts/kg) because of the fast physical sorption rates of charges on the surfaces of active materials comprising the capacitors. This mechanism may also enable long cycling lives (>100,000 cycles) because cycling generally does not cause major structural changes. However, as only the surface is typically utilized, the energy densities of SC's are very limited (e.g., 5-10 Wh/kg).

Hybrid supercapacitors (or supercapacitor-battery hybrid energy storage systems) have been proposed as a way to incorporate the advantages of both LIB's and SC's into one system. Existing hybrid supercapacitor systems consist of SC electrodes (activated carbon) as cathodes to ensure high power density through adsorption/desorption of anions, and LIB electrodes as anodes to provide high energy density by lithium (Li) insertion/extraction in a non-aqueous electrolyte. However, as noted above, such energy storage systems are manufactured and supplied as single or "integral" products. This requires the distributor to stock multiple SKU's to meet a variety of applications, that is, multiple modules having various combinations of LIB and SC components within the housing.

It is proposed herein to provide the LIB and the SC components in modular form. By providing the LIB and the SC as separate modules, the distributor is able to carry a much smaller inventory while meeting the needs of all applications. All that is required is for the distributor to select the desired battery and capacitor combination and connect them together to form a single power module.

Figure 5A:
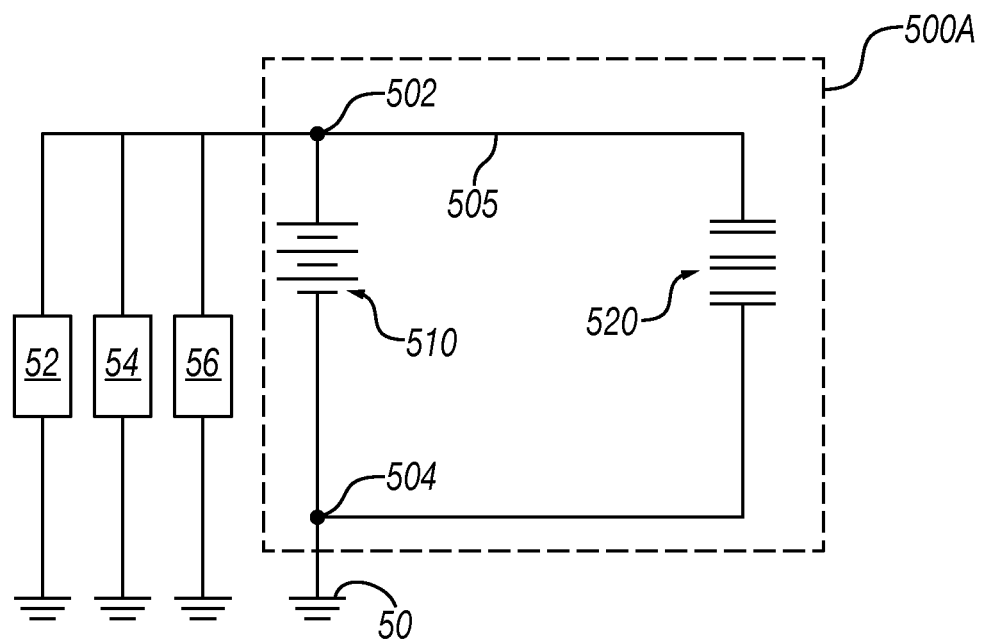
FIG. 5A is circuit diagram showing placement of the energy storage device into an electrical system, in a first embodiment.

FIG. 5A is circuit diagram showing placement of the energy storage device 100 into an electrical system 500A, in a first embodiment. The electrical system 500A may be an automobile, a truck, a refrigeration system, or any other system requiring electrical energy to run.

In the arrangement of FIG. 5A, the circuit diagram includes circuitry 505. The circuitry 505 includes two external terminals 502, 504. Terminal 502 represents a positive terminal while terminal 504 represents a negative or ground terminal (indicated at 50). The two-terminal energy storage device 100 can be configured to replace a standard two-terminal OEM battery.

A battery 510 is shown connected between terminals 502 and 504. Also, a capacitor 520 is shown connected between terminals 502 and 504. The battery 510 and the capacitor 520 are placed in parallel.

When used with an automobile or truck or motorcycle, the energy storage device 100 can be electrically connected to one or more vehicle loads. For example, the device 100 can be connected to a starter 52 and to a power supply 54 used to charge the device 100 as the vehicle is being driven. The power supply 54 may be an alternator. Other power supplies can be implemented instead of or in addition to alternator 54 such as a charging station for an electric or hybrid vehicle.

Embodiments of the device 100 allow both the battery 510 and the capacitor 520 to be charged from a power supply, such as the alternator 54, and also supply power to a vehicle system, such as the starter 52. In a preferred vehicle application, both the battery 510 and the capacitor 520 are charged from the alternator 54 with a charge voltage.

Those of ordinary skill in the art will understand that the battery 510 will maintain a high state of charge while connected to the alternator 54 or other power supply. Upon being disconnected from the power supply, the state of charge of the battery 510 will begin to dissipate. Voltage drops in the battery 510 can reduce the battery's life, preventing the battery 510 from providing a reliable starter crank.

Providing a capacitor 520 in parallel with the battery 510 allows the capacitor 520 to mitigate against starter crank problems. The circuitry 505 of FIG. 5A allows a bi-directional flow between the battery 510 and the capacitor 520. This provides a system wherein the capacitor 520 is configured to "re-charge" the battery 510 when the state of charge and voltage in the capacitor 520 is higher than the battery 510. The increased cycle efficiency of the capacitor 520 can also allow the capacitor 520 to increase the life of the battery 510. In addition, the efficient charge acceptance and discharge rate of the capacitor 520 can allow the capacitor 520 to mitigate some of the spikes and drops in power typical during operation of the device 100, such as during cranking.

Of interest, any current supplied to the vehicle starter 52 from the storage device 100 during a vehicle start event will be generated proportionally from both the battery 510 and the capacitor 520. Additionally, because current can flow between the capacitor 520 and the battery 510, the available charge and voltage of the capacitor 520 will also generally move towards a charge and voltage equilibrium relative to that of the battery 510 when the alternator 54 (or other power source) is in an "off" state. Such voltage equilibrium may generally be less than the state of charge and voltage of the capacitor 520 if it were to be electrically isolated from the battery 510.

Figure 5B:
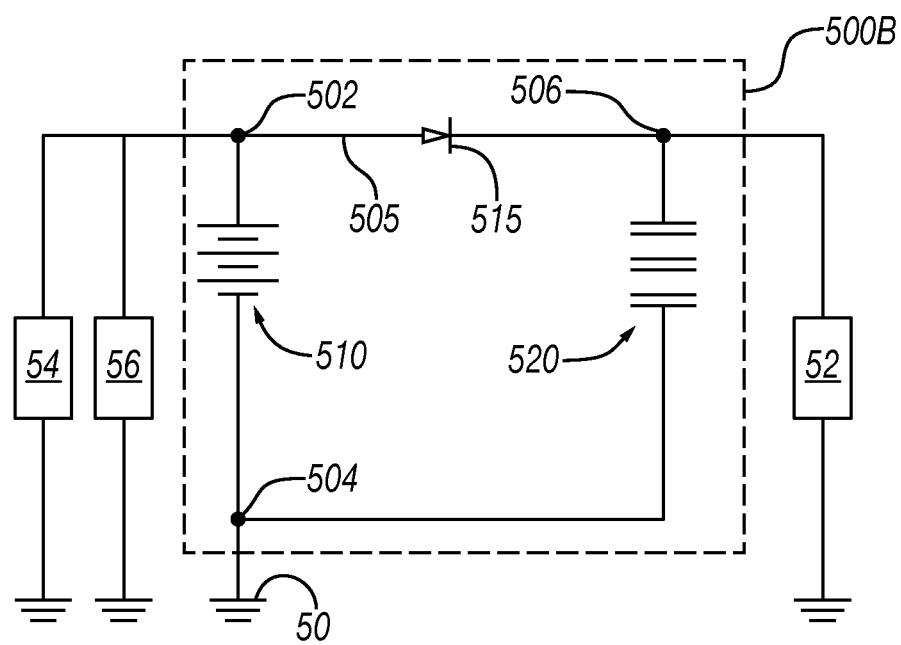
FIG. 5B is circuit diagram showing placement of the energy storage device into an electrical system, in a second embodiment.

FIG. 5B is circuit diagram showing placement of the energy storage device 100 into an electrical system 500B, in a second embodiment. The electrical system 500B is generally similar to the electrical system 500A described above. However, in this instance a third terminal 506 is provided as part of the circuitry 505.

In the circuitry arrangement of FIG. 5B, terminal 502 comprises a first positive terminal. This terminal 502 is connect with the alternator 54. Terminal 506 comprises a second positive terminal that is connected with the starter 502. This arrangement allows the starter 52 to be electrically configured on the same terminal of the device 100 as, for example, the capacitor 520. Additionally, the alternator 54 may be electrically connected with the same terminal as the battery 510.

In FIG. 5B, a rectifier 515 is positioned between the alternator terminal 502 and the starter terminal 506. The rectifier 515 may comprise, for example, a diode, a synchronous rectifier, or a transistor. The rectifier 515 allows current flow from the alternator 52 to the capacitor 520, allowing the capacitor 520 to be charged while preventing or reducing current flow from the capacitor 520 to terminal 502 and battery 510. Such an embodiment can at least partially electrically isolate the capacitor 520 from the battery 510.

The three-terminal circuitry 505 of FIG. 5B isolates the capacitor 520 from the battery 510 by allowing only uni-directional current flow. Such an arrangement has the benefit of allowing only the power and current stored in the capacitor 520 to be provided to the starter 52 during a start event. This also allows the capacitor 520 to supply power to high power pulse devices, such as the starter 52, allowing the battery 510 to contribute power to devices with medium or longer period demands.

In operation, the battery 510 may sometimes have an undesirable lower voltage because the battery has been accidently discharged, or has been insufficiently re-charged (such as during a start/stop event), or has been operating in a cold environment. By at least partially isolating the battery 510 and the capacitor 520 by using the rectifier 515 in a three-terminal system, the capacitor 520 can remain at a higher voltage and state of charge when the alternator 54 or other power supply is turned off, separate from the state of charge, voltage and capacity of the battery 510. Such isolation thus can also provide an overall higher energy to the starter 52 from the capacitor 520, without the limiting effects of the battery 510.

In any instance, upon assembly, the energy storage device 100 will include a positive device terminal (such as terminal 502) and a negative device terminal (such as terminal 504). The energy storage device 100 includes a battery 510 connected between the first terminal 402 and the second terminal 504. The energy storage device also includes a capacitor 520 connected in parallel with the battery 510. In one optional embodiment, the energy storage device 100 includes a rectifier 515 connected between the first terminal 502 and the capacitor 520. As noted, the rectifier 515 is configured to allow substantially uni-directional current flow from the first terminal 502 to the capacitor 520. In either arrangement no switch is required or used for controlling electrical communication between the capacitor and the first terminal.

In an alternative arrangement, a second battery may be used as part of the circuitry 515. In this arrangement, the second battery is connected in parallel with and between the first battery 510 and the capacitor 520. A first rectifier is then connected in parallel with and between the first battery and the second battery, while a second rectifier is connected between the second terminal and the first rectifier. Yet a third rectifier may be connected between the first rectifier and the first terminal.

Returning to FIGS. 2 and 3, it is preferred that the body 115 for the battery 110 and the body 125 for the capacitor 120 each define a separate housing. The housings form independent "modules" for the battery 110 and for the capacitor 120. When mechanically secured together and placed in electrical communication, the battery 110 and the capacitor 120 together form the energy storage device 100 in modular form.

Additional features may be included with the energy storage device 100. For example, the energy storage device 100 may comprise a sensor. The sensor senses the internal resistance of the battery 110. This enables a user to determine the condition of the battery 110. Those of ordinary skill in the art will understand that when a battery sits idle, a chemical reaction can take place in the cells that causes copper sulfate to build up on the battery terminals. This, in turn, rapidly increases the internal resistance of the battery, reducing its ability to generate the charge needed to crank an engine.

The energy storage device 100 may further include a micro-controller. The micro-controller receives signals from the sensor that are indicative of internal resistance. Using a transceiver, the micro-controller then sends the signals to a computer (which may be a network server or may be an application running on a portable communications device, or both). Signals are sent using a wireless communications system.

The signals are processed by the computer such that a remote operator is able to review the signals and determine the status of the battery in real time. In addition, the micro-controller may have a GPS module. In this instance, the micro-controller sends signals indicative of GPS coordinates. In this way, the operator may determine a location of the energy storage device 100 at any given moment. This is of particular importance when the operator is monitoring the condition of a battery associated with a rail car or other moving object remote from a service center.

The energy storage device 100 is intended to provide electrical power for a mechanical object. For example, the energy storage may provide electrical energy to a starter for a car or a boat. In the present inventions, the mechanical object may be a car, a truck or a marine vessel. Alternatively, the mechanical device may be a jet ski, a motorcycle or a so-called four-wheeler. Alternatively still, the mechanical device may be an air conditioning unit used for a refrigeration truck or for a rail car.

Figure 6A:
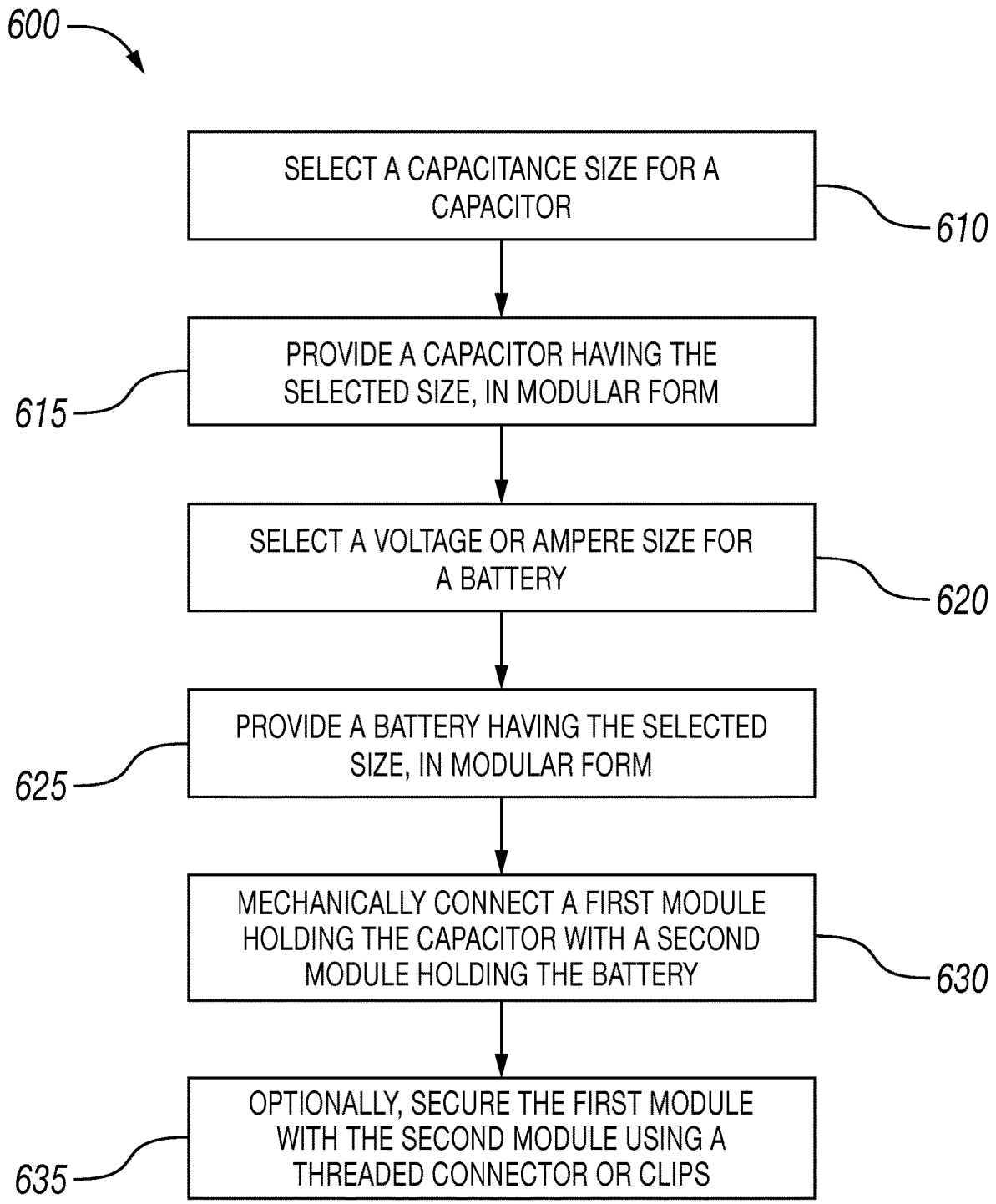
FIGS. 6A and 6B represent a single flow chart showing steps for performing the method of forming a charge storage device, in one embodiment.
Figure 6B:
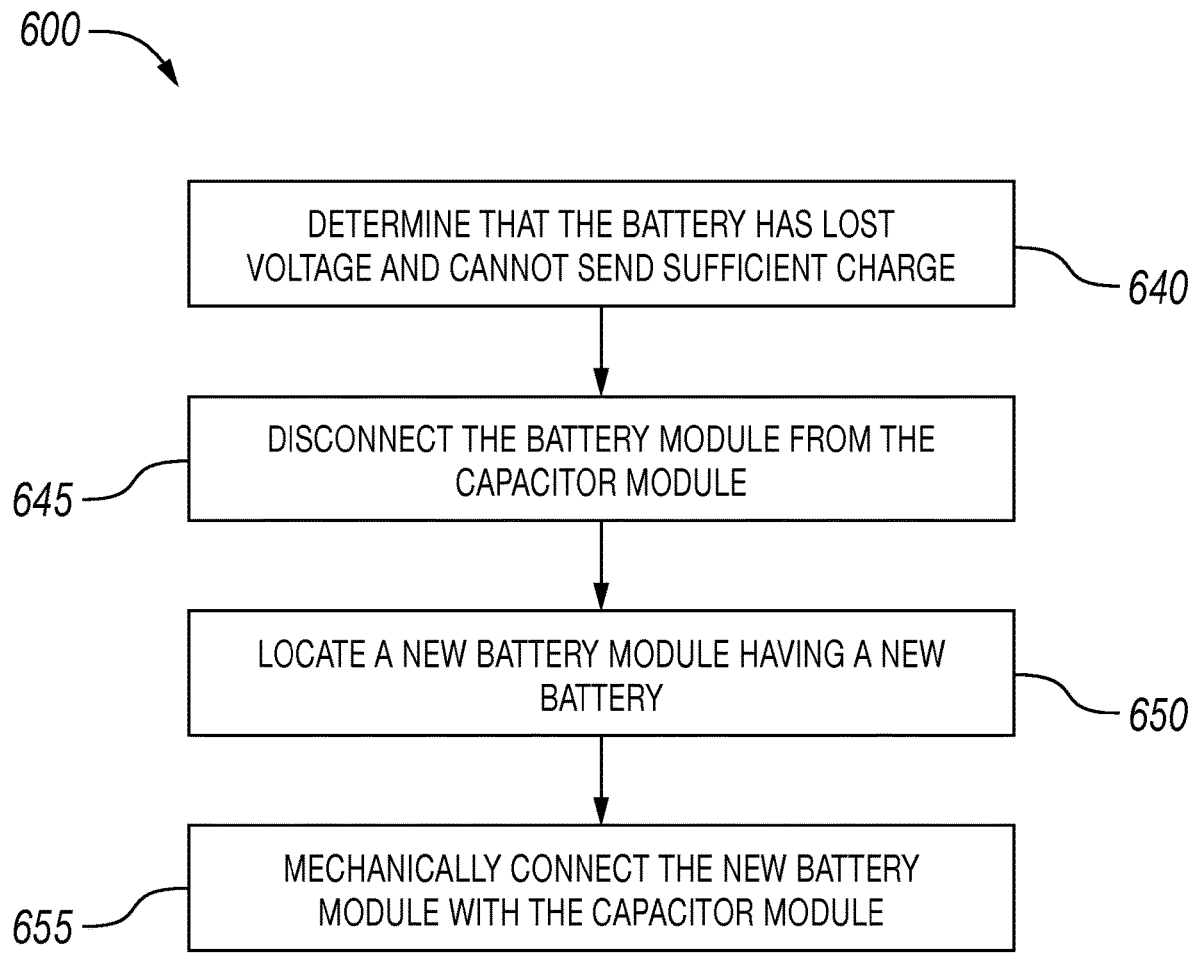

Using the energy storage device 100, a method of forming a charge storage device is provided herein. FIGS. 6A and 6B present a flow chart showing steps for a method 600 of forming a charge storage device, in one embodiment.

In one aspect, the method 600 first comprises selecting a size for a capacitor. This is shown in Box 610 of FIG. 6A. In this instance, "size" refers to capacitance, or storage potential. The method 600 then includes providing a capacitor having the selected size, in modular form. This is seen in Box 615. It is understood that the capacitor may be a bank of capacitors depending on the amount of stored electrical energy that is needed.

The method 600 also includes selecting a size for a battery. This is indicated in Box 620. Preferably, the battery is a lithium battery. The lithium battery may be a lithium-ion battery, a lithium-iron phosphate battery, a lithium-cobalt oxide battery, a lithium-nickel manganese cobalt oxide battery, a lithium-manganes oxide battery, a lithium titanate battery, or any other lithium battery suitable for providing electrical power to a mechanical device.

The method 600 then includes providing a battery having the selected size. This is provided in Box 625. Preferably, the battery is also in modular form.

In one embodiment of the method 600, the capacitor resides within a first module while the battery resides within a second module. The term "module" refers to an independent housing holding an electrical device. The first module has a mechanical connector portion and an electrical connector. Similarly, the second module has a mechanical connector portion and an electrical connector.

The method 600 additionally includes mechanically connecting the first module and the second module by connecting the mechanical portion of the battery to the mechanical portion of the capacitor. This is provided in Box 630. This is done while simultaneously connecting the electrical connector of the capacitor with the electrical connector of the battery.

Preferably, the electrical connector of the capacitor and the electrical connector of the battery are mated through a male-female connection and a threaded connector, or with clips. This is shown in box 635. In any instance, the first module and the second module are combined to form a hybrid energy storage device. The hybrid energy storage device comprises a first device terminal and a second device terminal. The battery is connected between the first device terminal and the second device terminal, while the capacitor is connected in parallel with the battery.

In one embodiment, a rectifier is provided for the energy storage device. The rectifier is connected between the first device terminal and the capacitor. The rectifier is configured to provide unidirectional current flow from the first device terminal to the capacitor.

As an alternative to the rectifier, the energy storage device may include a current limiter. The current limiter is connected between the first device terminal and the capacitor and acts as a resistor. In this respect, the current limiter is configured to limit current flow from the first device terminal to the capacitor. In one function, the current limiter is configured to reduce current draw from the battery when the capacitor powers an external device. The current limiter may comprise at least one of a positive-temperature-coefficient resistor and a resistive bridge.

The current limiter is preferably used in lieu of the rectifier 515 in FIG. 5B. Alternatively, the current limiter may be connected in series between the rectifier 515 and the capacitor.

It is noted that a battery 110 as might be used in the energy storage device 100 may only have up to 2,000 charge cycles (or fewer). Further, the battery 110 may be susceptible to losing voltage if it is left unused for several months (or even weeks) or if it is exposed to extreme cold temperatures. In this instance, the battery 110 (in its modular form) would have to be replaced even before it reaches 2,000 charge cycles.

At the same time, it is observed that a capacitor 120 as could be used in the energy storage device 100 may have up to one million charge cycles. Further, the capacitor 120 is virtually immune to the effects of cold at levels that are detrimental to a battery 110 and can store charge for off-peak hours. Thus, the capacitor 120 will far outlast the battery 110. Thus, as part of the method 600, steps may additionally be taken as follows:

determining that the battery has lost sufficient voltage to start an engine [shown in Box 640 of FIG. 6B];
  disconnecting the first module from the second module [provided in Box 645];
  locating a new second module having a new battery, wherein the second module also has a mechanical connector portion and an electrical connector [indicated at Box 650]; and
  mechanically connecting the first module to the new second module while simultaneously connecting the electrical connector of the capacitor with the electrical connector of the new battery [seen in Box 655].

This allows a new charge storage device to be provided without discarding the capacitor.

Further uses and variations of the hybrid energy storage may fall within the spirit of the claims, below. For example, in yet another alternative embodiment the battery and the capacitor are not separate modules, but instead each resides in the same housing. In this instance, mechanical connectors for the separate housings are not needed since the battery and the capacitor are already housed together.

In this arrangement, the housing will have a base, a removable top and a plurality of side walls. A user may access the electronics for the energy storage device by removing the top. In this instance, the "top" may represent covers 112, 122 as an integral piece.

As a part of the alternative method, a user may determine that the battery portion of an energy charge device has become depleted or is otherwise incapable of delivering sufficient voltage to cause the starter to crank the engine. This may be due to an inactive state of the engine for a period of time. For example, it is not uncommon for the battery of a jet ski or a motorcycle or a four-wheeler to "go dead" over the winter or otherwise if it is not activated at least every few weeks. Jet ski batteries are notorious for having to be replaced each spring after sitting idle for months, including during a cold winter.

When this occurs, in accordance with the present inventions in one embodiment, the user need not replace the entire charge storage device; rather, the user may replace only the battery portion (assuming that the battery portion cannot be re-charged). In the alternative method, the user may remove the top from the housing, remove the initial battery from the housing, replace the initial battery with a new battery, and then return the top (or lid) of the housing to the housing of the charge storage device.

Figure 7:
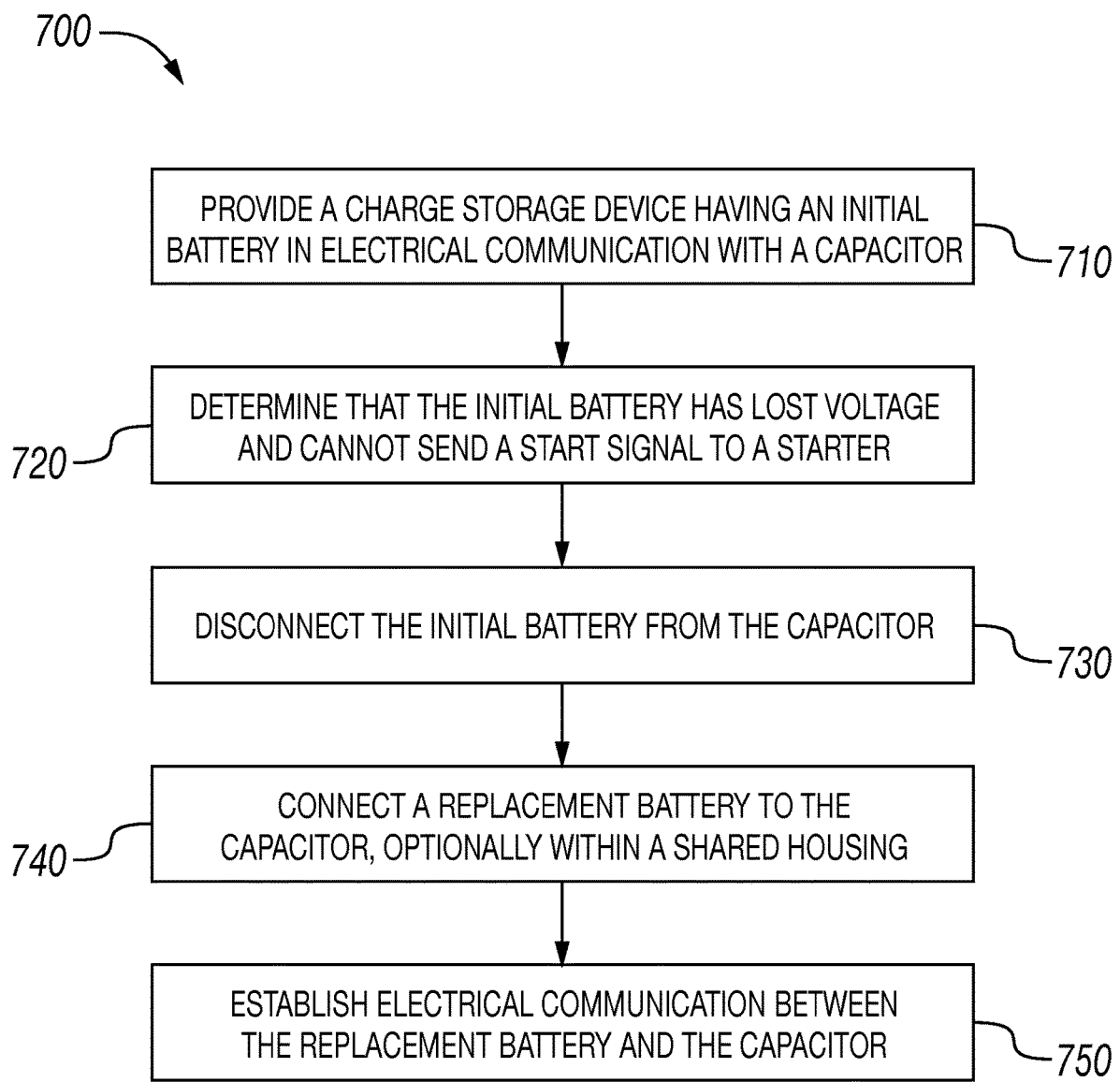
FIG. 7 is a flow chart showing steps for performing a method of charging a mechanical object having a battery as in FIG. 1, in one embodiment.

Turning now to another embodiment in FIG. 7, a flow chart shows steps for performing a method 700 of charging a mechanical object. The mechanical object may be a car, a truck, a boat, or other object having an internal combustion engine. Alternatively, the object may be a power sport vehicle such as a jet ski, a motorcycle or an off-road vehicle such as a so-called four-wheeler.

The method 700 first includes identifying (or providing) a charge storage device. This is shown in Box 710. In this step 710, the charge storage device is preferably in accordance with the charge storage device 100 of FIGS. 2 through 4 in any of its embodiments. This means the charge storage device includes a battery 110 and a capacitor 120, each in modular form.

In the step of Box 710, the battery is an "initial battery." The initial battery is in electrical communication with a capacitor. The initial battery and the capacitor may reside in the same housing, but more preferably reside in separate housings as independent modules.

The method 700 next includes the step of determining that the initial battery has lost voltage. This is shown in Box 720. The step of Box 720 may involve the user attempting to start an internal combustion engine but being unable to activate the starter due to inadequate charge. In other words, the initial battery cannot send a start signal to the starter associated with the engine.

The method 700 also includes disconnecting the initial battery from the capacitor. This is provided in Box 730. The step of Box 730 includes mechanically separating the initial battery from the capacitor if they are in separate modules. The step also includes removing the electrical connection that existed between the initial battery and the capacitor.

The method 700 further includes connecting a replacement battery to the capacitor. This is offered in Box 740. The step of Box 740 may be performed by providing a new battery module to replace the old (or initial) battery module.

The method 700 additionally comprises establishing an electrical communication between the replacement battery and the capacitor. This is shown in Box 750. This step 750 may be provided by installing the replacement battery into a shared housing with the capacitor and then providing electrical communication. More preferably, the step 750 is conducted by mechanically and electrically connecting a replacement battery module (such as module 110 in FIG. 1) with the capacitor (such as module 120 in FIG. 1), forming a single hybrid energy storage device 100.

One benefit to this method 700 is that an owner of the mechanical object having the charge storage device will save money over time since an entire battery does not have to be discarded every year or so. Instead, the owner need only replace the battery portion.

Figure 8:
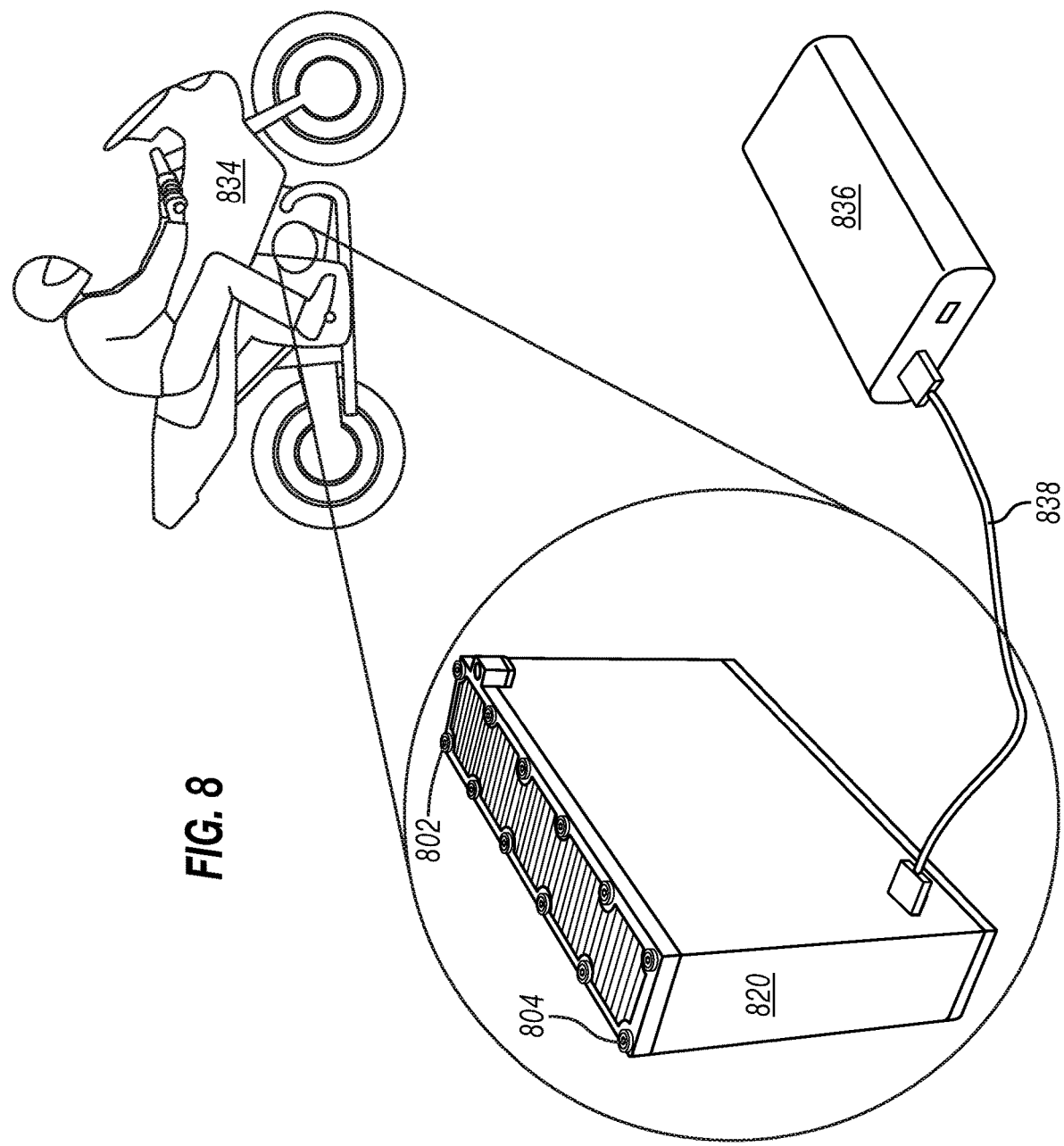
FIG. 8 is an elevational view of a mechanical object as may be charged in FIG. 7, as a motorcycle.

Referring to FIG. 8, another embodiment according to the disclosure places only a capacitor 820 on board a mechanical object, such as a motorcycle 834 as shown in this example. The capacitor 820 will reside in its own housing in the motorcycle 834, with first and second terminal devices or a compound terminal with sides 802, 804. Terminal side 802 represents a positive terminal while terminal side 804 represents a negative or ground terminal, both of which will connect to an internal combustion engine of the motorcycle 834 and operate in place of a standard two-terminal battery. When charged, the capacitor 820 offers ample voltage to energize a starter and crank an internal combustion engine of the motorcycle 834. This means that a battery (or battery module) need not be employed on the mechanical object 834 to provide a start signal to the starter.

As shown in the embodiment of FIG. 8, there is no battery on-board the motorcycle 834. When the motorcycle 834 is being ridden, the capacitor 820 can be re-charged in the same way that a battery is recharged from an electrical system of a vehicle; for instance, from a flywheel generator in the case of a two-stroke engine, or in the case of a four-stroke engine, its alternator. However, if the motorcycle 834 sits idle (and assuming it is not plugged in somewhere), the capacitor 820 will lose voltage, usually much faster than a discharging battery. To solve this problem, an operator will carry a power pack 836. An exemplary power pack 836 is available from Solice® of Xiamen, Fujian China, although any suitable, preferably small and portable, power pack 836 may be utilized.

By way of example, a Solice® brand, handheld power bank 836 may have a 20,000 milliampere hour (mAh) capacity with dual USB outputs. Alternatively, a RAVPower™ brand power pack can provide 16,750 mAh of recharging power. Still other units suitable for use as power pack 836 may range from about 10,000 mAh to about 30,000 mAh of power, and preferably be sufficiently compact and lightweight to store and carry by hand. Preferably, the power pack 836 is pocket-sized for carrying in the rider's pocket or for keeping in a storage compartment for the motorcycle 834.

As shown in the inset of FIG. 8, the capacitor 820 will be re-charged in approximately three to five (3 to 5) minutes using the power pack 836. Here, the capacitor 820 and the power pack 836 are connected using a removable USB connection 838. Once the capacitor 820 is recharged, the operator can disconnect the USB connection 838 and the power pack 836 from the capacitor 820 and dry-store the USB connection 838 and the power pack 836 until needed again.

Figure 9:
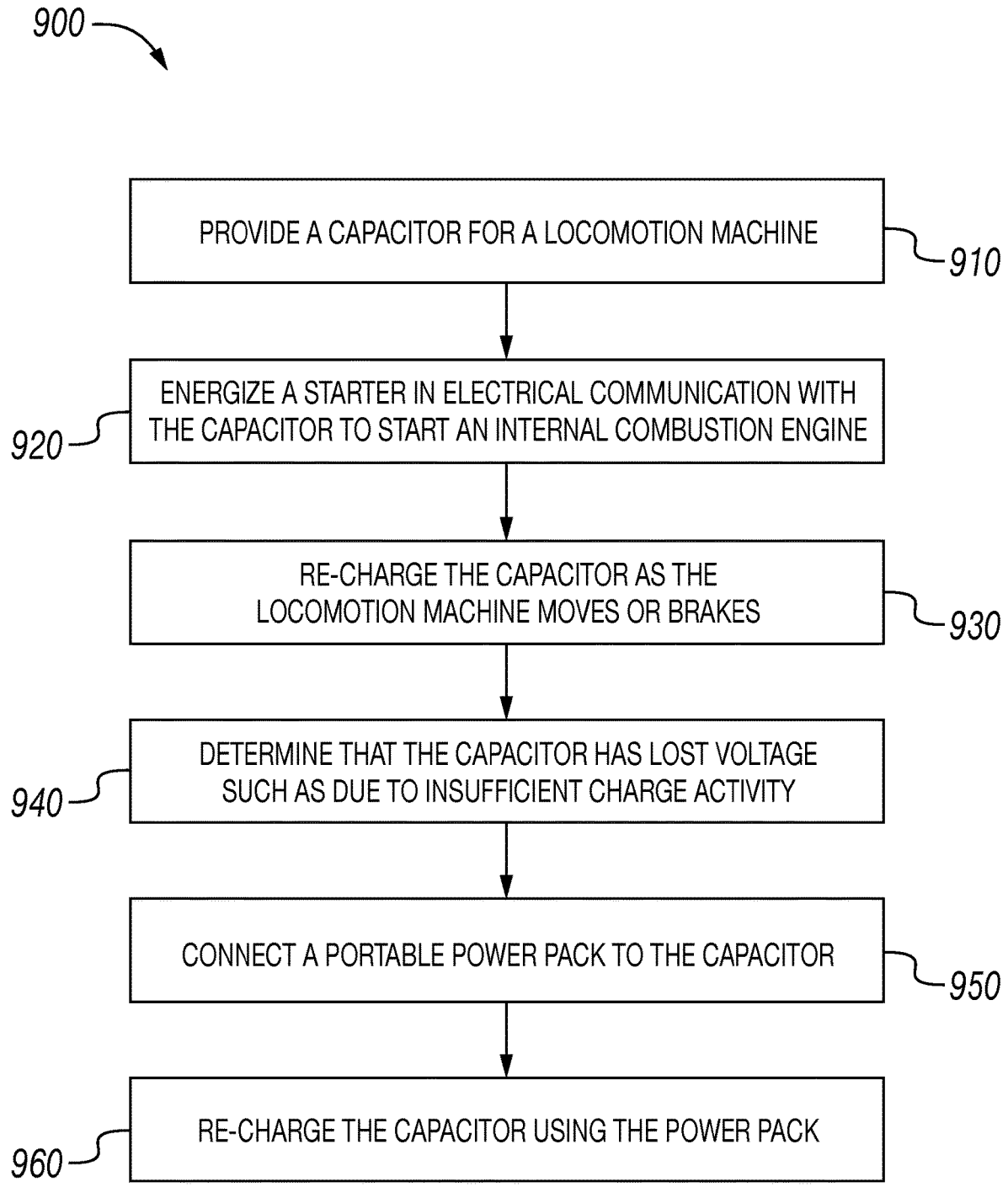
FIG. 9 is flow chart showing steps for performing a method of charging (or re-charging) the capacitor as in FIG. 8, in one embodiment.

FIG. 9 more particularly shows a method 900 for charging a mechanical object according to a further embodiment of the disclosure. Here, the mechanical object is referred to as a "locomotion machine."

The method 900 first includes providing a capacitor. This is seen in Box 910. The capacitor is an on-board capacitor (such as capacitor 820) in a locomotion machine. The locomotion machine may be, for example, a motorcycle, a jet ski, a boat, a car, a truck or the like. The locomotion machine may operate with a combustion engine that is dependent on an electrical charge from a starter to turn the engine over.

The method 900 next includes energizing a starter in electrical communication with the capacitor. This is seen in Box 920. The step of Box 920 of energizing the starter turns over the engine, i.e., an internal combustion engine, of the locomotion machine using the starter.

The method 900 additionally comprises recharging the capacitor as the locomotion machine moves or brakes. This is provided in Box 930, in the case of a motorcycle 834, the capacitor 820 can be re-charged through a known braking system. In the case of a four-wheeler, the capacitor may be re-charged in the same way that a battery is recharged from an electrical system of a vehicle; for instance, from a flywheel generator in the case of a two-stroke engine, or in the case of a four-stroke engine, its alternator.

The method 900 further includes determining that the capacitor has lost voltage. This is seen in Box 940. The capacitor 820 may lose voltage due to insufficient recharge activity. This may occur, for example, when the motorcycle 834 sits in a garage during a rainy season, or when a jet ski is docked at a marina over a cold winter.

The method 900 also includes connecting a power pack 836 to the capacitor 820. This is provided in Box 950. The power pack 836 is designed to be portable, and is preferably pocket-sized. Connecting the power pack 836 to the capacitor 820 includes using a power cable 838 to provide an electrical connection. The power cable may be, for example, a standard USB cable or a micro-USB cable.

The method 900 of FIG. 9 finally includes recharging the capacitor 820 with the power pack 836. This is shown in Box 960. Re-charging means that a suitably charged battery (or battery bank) in the power pack 836 transfers electrical energy to the capacitor 820 for at least temporary storage.

It is observed that a benefit to the method 900 is that the owner of the locomotion machine does not need to purchase or maintain an on-board battery. Because batteries are very heavy, the locomotion machine operating with only the capacitor as the electrical energy storage device is lighter and less expensive. Further, because no battery is required on-board, the manufacturer is freed from environmental and regulatory restrictions and notice requirements that come with the selling or handling of lead-containing materials.

The use of a capacitor charged by a hand-held battery is also beneficial to the railroad company. Some refrigerated railroad cars utilize auxiliary power in the form of solar panels. However, solar panels are not able to generate power when they are covered with snow or when the railroad car is at rest within a tunnel or under a bridge. Where the operator can quickly charge a capacitor, then the refrigeration unit can be placed back on-line.

In one aspect, the train will have at least one refrigerated car that uses an internal combustion engine for powering a refrigeration unit. Each of the at least one refrigerated car comprises a transceiver configured to send location signals and capacitor strength signals to an operator in real time. If the operator determines that a refrigeration unit has lost power, the operator can locate the refrigerated car, connect a portable batter to a capacitor using a power cable, and quickly re-start the combustion engine.

The same procedure may be used for the over-the-road truck that hauls a refrigerated trailer. Such trucks carry loads that are refrigerated using internal combustion engines.

It will be appreciated that the inventions are susceptible to modification, variation and change without departing from the spirit thereof.

We claim:

1. A method of charging a mechanical object using a charge storage device, the method comprising:
   providing a charge storage device comprising:
      a capacitor module representing a capacitor housing having a side wall, and a capacitor residing within the capacitor housing, the capacitor module having a mechanical connector portion and an electrical connector,
      a first battery module representing a battery housing having a side wall, and a battery residing within the battery housing, the battery module also having a mechanical connector portion and an electrical connector,
      and wherein the capacitor module and the first battery module are mechanically connected in side-by-side relation and are placed in electrical communication by the respective electrical connectors along adjacent side walls;
   determining that the battery of the first battery module has lost voltage;
   separating the first battery module from mechanical connection and electrical communication with the capacitor module;
   selecting a second battery module from an inventory of battery modules having different kilo-watt hours but interchangeable battery housings, wherein the second battery module also represents a battery housing, and a battery residing within the battery housing, with the second battery module also having a mechanical connector portion and an electrical connector; and
   mechanically connecting the second battery module to the capacitor module such that the second battery module and the capacitor are simultaneously placed in electrical communication with each other.

2. The method of claim 1, wherein:
   the mechanical connector portion and the electrical connector of the capacitor module reside along the side wall of the capacitor module; and
   the mechanical connector portion and the electrical connector of the second battery module reside along a side wall of the second battery module.

3. The method of claim 1, wherein: the capacitor module and the second battery module are mechanically connected by connecting the mechanical connector portion of the housing of the capacitor module to the mechanical connector portion of the housing of the second battery module through a male-female connection while also connecting the electrical connector of the capacitor module with the electrical connector of the second battery module through a mating connection without added wires or busbars.

4. The method of claim 3, wherein the charge storage device further comprises:
   a first device terminal and a second device terminal, wherein:

the battery of the second battery module is connected between the first device terminal and the second device terminal as part of an electrical circuit, and the capacitor of the capacitor module is connected in the electrical circuit in parallel with the battery of the second battery module.

5. The method of claim 4, wherein:

the energy storage device further comprises a threaded connector for securing the male-female mating connection between the capacitor module and the second battery module.

6. The method of claim 5, wherein:

a male portion of the male-female connection resides proximate a top of the side wall of the capacitor module, and a female portion of the male-female connection resides proximate a top of the side wall of the second battery module;

the female portion is dimensioned to closely receive the male portion; and each of the female and male portions have a through-opening configured to align and to receive the threaded connector when the male portion receives the female portion.

7. The method of claim 5, wherein:

a male portion of the male-female connection resides proximate a top of the side wall of the second battery module, and a female portion of the male-female connection resides proximate a top of the side wall of the capacitor module;

the female portion is dimensioned to closely receive the male portion; and each of the female and male portions have a through-opening configured to align and to receive the threaded connector when the male portion receives the female portion.

8. The method of claim 3, wherein the energy storage device further comprises:

a first clip connected to the side wall of the capacitor module and serving as the mechanical connector for the capacitor module; and a second clip connected to the side wall of the second battery module and serving as the mechanical connector for the second battery module;

wherein the capacitor module and the second battery module are mechanically connected by interlocking the first clip with the second clip.

9. The method of claim 3, wherein:

the capacitor module comprises a USB port; and the method further comprises plugging a hand-held battery pack into the USB port in order to re-charge the capacitor.

10. A method of starting a vehicle having a combustion engine and an electric starter, using a charge storage device, the method comprising:

providing a charge storage device, comprising:

a capacitor module representing a capacitor housing, and a capacitor residing within the capacitor housing, the capacitor module having a mechanical connector portion and an electrical connector, with the capacitor module being in electrical communication with the electric starter;

a first battery module representing a battery housing, and a battery residing within the battery housing, the first battery module also having a mechanical connector portion and an electrical connector;

wherein the capacitor module and the first battery module are mechanically connected in adjacent relationship and are in electrical communication with one another;

determining that the battery of the first battery module has lost voltage;

removing the first battery module from mechanical and electrical communication with the capacitor module;

selecting a second battery module from an inventory of battery modules having different kilo-watt hours but interchangeable battery housings, with the battery of the second battery module having the same kilo-watt hour value as the battery of the first battery module;

replacing the first battery module with the second battery module such that the second battery module is mechanically connected in adjacent relationship through a male-female mating connection and simultaneously is in electrical communication with the capacitor module through a mating connection without added wires or busbars; and activating an ignition to send a charge from only the capacitor to the starter in order to start the vehicle.

11. The method of starting a vehicle of claim 10, further comprising:

using a hand-held battery pack, re-charging the capacitor, recharging the battery of the second battery module, or both.

12. The method of starting a vehicle of claim 10, wherein each of the initial battery and the replacement battery is a lithium battery.

13. The method of starting a vehicle of claim 12, wherein the vehicle is selected from one of an automobile, a truck, a boat, a motorcycle, a jet ski, and an off-road vehicle.

14. A method of charging a mechanical object using a charge storage device, the method comprising:

providing a capacitor in a locomotion machine;

energizing a starter in electrical communication with the capacitor using only a charge from the capacitor;

starting an internal combustion engine of the locomotion machine using a charge from the starter;

re-charging the capacitor as the locomotion machine moves;

determining that the capacitor has lost voltage due to insufficient recharge activity;

electrically connecting a portable power pack to the capacitor; and re-charging the capacitor with the power pack;

and wherein the locomotion machine does not have an on-board battery configured to provide a charge to the starter.

15. The method of claim 14, wherein re-charging the capacitor as the locomotion machine moves comprises re-charging the capacitor using a flywheel generator or an alternator while the locomotion machine is being driven by a driver or ridden by a rider.

16. The method of claim 14, wherein re-charging the capacitor as the locomotion machine moves comprises re-charging the capacitor using a regenerative braking system.

17. The method of claim 14, wherein the power pack is connected to the capacitor using an electrical cable.

18. The method of claim 17, wherein:

the power pack is portable;

the electrical cable is a USB cable; and the capacitor resides in a housing having a USB port.

19. The method of claim 14, wherein the locomotion machine has an internal combustion engine and is selected from one of an automobile, a truck, a boat, a motorcycle, a jet ski, and an off-road vehicle.

20. The method of claim 14, wherein:
the locomotion machine is a train having at least one refrigerated car or an over-the-road truck having a refrigerated trailer; and
the locomotion machine uses the internal combustion engine for powering a refrigeration unit.

21. The method of claim 20, wherein:
the locomotion machine is a train; and
each of the at least one refrigerated car comprises a transceiver configured to send location signals and capacitor strength signals to an operator in real time.

22. A method of charging a motorized vehicle, comprising:
providing a motorized vehicle, wherein the motorized vehicle has:
an internal combustion engine,
a capacitor, and
a starter for delivering a starting charge for the combustion engine, wherein the starter receives its electrical power for delivering the starting charge from the capacitor and is not in electrical communication with an on-board battery;
placing a handheld battery pack in electrical communication with the capacitor;
using the handheld battery pack, charging the capacitor;
starting the internal combustion engine using only the charge from the starter; and
removing the handheld battery pack from its electrical communication with the capacitor.

23. The method of claim 22, further comprising:
placing the handheld battery pack back into electrical communication with the capacitor;
using the handheld battery pack, re-charging the capacitor.

24. The method of claim 23, wherein the motorized vehicle is a motorcycle, a four-wheeler or a jet ski.

25. The method of claim 23, wherein:
the motorized vehicle is a motorcycle; and
further comprising additionally recharging the capacitor using a flywheel generator when the motorcycle is driven by a driver.

26. A method of charging a mechanical object using a charge storage device, the method comprising:
providing a selected capacitor module from a plurality of capacitor modules, the selected capacitor module representing a capacitor housing with a capacitor residing within the capacitor housing, and wherein the capacitor modules have differing capacitance values with interchangeable housings,
providing a first battery module representing a battery housing, and a battery residing within the battery housing,
wherein the selected capacitor module and the first battery module are mechanically connected in adjacent relationship and are in electrical communication with one another;
determining that the battery of the first battery module has lost voltage;
removing the first battery module from mechanical and electrical communication with the selected capacitor module;
selecting a second battery module from an inventory of battery modules having different kilo-watt hours but interchangeable battery housings, with the battery of the second battery module having a same kilo-watt hour value as the battery of the first battery module;
replacing the first battery module with the second battery module such that the second battery module is mechanically connected in adjacent relationship through a male-female mating connection,
replacing the selected capacitor module with a replacement capacitor module from the plurality of plurality of capacitor modules, wherein the replacement capacitor module has a same capacitance value as the selected capacitance module, and
wherein the second battery module and the replacement capacitor module are mechanically connected in adjacent relationship through a male-female mating connection and simultaneously connected in electrical communication through a mating connection without added wires or busbars.

27. The method of claim 26, further comprising:
providing a vehicle having a combustion engine and an electric starter as the mechanical object,
starting the vehicle, whereby ignition sends a charge from only the capacitor of the replacement capacitor module to the starter in order to start the vehicle.

* * * * *